United States Patent
Ross et al.

(10) Patent No.: US 10,554,958 B2
(45) Date of Patent: Feb. 4, 2020

(54) SYSTEMS AND METHODS FOR INTERLEAVING MULTIPLE ACTIVE CAMERA FRAMES

(71) Applicant: Microsoft Technology Licensing, LLC, Redmond, WA (US)

(72) Inventors: Jonathan Kent Ross, Woodinville, WA (US); Raymond Kirk Price, Redmond, WA (US); Preetika Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 15/457,731

(22) Filed: Mar. 13, 2017

(65) Prior Publication Data
US 2018/0262740 A1 Sep. 13, 2018

(51) Int. Cl.
*H04N 13/296* (2018.01)
*G06K 9/00* (2006.01)
*H04N 13/254* (2018.01)

(52) U.S. Cl.
CPC ....... *H04N 13/296* (2018.05); *G06K 9/00604* (2013.01); *H04N 13/254* (2018.05); *H04N 2213/001* (2013.01)

(58) Field of Classification Search
CPC ............... H04N 13/296; H04N 13/254; H04N 2213/001; G01S 7/4811; G01S 17/89; G01S 17/87; G06K 9/00604
See application file for complete search history.

(56) References Cited

U.S. PATENT DOCUMENTS

| | | | |
|---|---|---|---|
| 5,481,622 A * | 1/1996 | Gerhardt | A61B 3/113 345/158 |
| 8,797,439 B1 | 8/2014 | Coley et al. | |
| 2004/0196433 A1 | 10/2004 | Durnell | |
| 2011/0242342 A1 | 10/2011 | Goma et al. | |
| 2012/0075534 A1* | 3/2012 | Katz | H04N 9/3182 348/602 |
| 2012/0194650 A1 | 8/2012 | Izadi et al. | |
| 2013/0053101 A1 | 2/2013 | Tsai et al. | |
| 2014/0368609 A1 | 12/2014 | Chang et al. | |
| 2015/0077601 A1* | 3/2015 | Cami | H04N 5/3532 348/295 |
| 2015/0163414 A1 | 6/2015 | Nikkanen et al. | |
| 2015/0185054 A1 | 7/2015 | Hesch et al. | |

(Continued)

FOREIGN PATENT DOCUMENTS

EP 2594959 A1 5/2013
WO 2015198300 A1 12/2015

OTHER PUBLICATIONS

"Syncronizing Multiple o3d303 sensors over 6Hz #46", https://github.com/lovepark/libo3d3xx/issues/46, Published on: Feb. 25, 2016, 13 pages.

(Continued)

*Primary Examiner* — Tat C Chio
(74) *Attorney, Agent, or Firm* — Ray Quinney & Nebeker P.C.; John O. Carpenter

(57) ABSTRACT

A system for three-dimensional imaging includes a plurality of three-dimensional imaging cameras. A first camera and a second camera may have integration times that are interleaved with the readout time of the other camera to limit interference while increasing framerate and throughput.

20 Claims, 7 Drawing Sheets

(56) References Cited

U.S. PATENT DOCUMENTS

| | | | |
|---|---|---|---|
| 2015/0341576 A1 | 11/2015 | Gu et al. | |
| 2015/0373322 A1* | 12/2015 | Goma | G03B 17/38 |
| | | | 348/21 |
| 2016/0139265 A1* | 5/2016 | Yahav | G01S 17/06 |
| | | | 356/51 |
| 2017/0115395 A1* | 4/2017 | Grauer | G01S 7/4865 |

OTHER PUBLICATIONS

"Rolling and Global Shutter", http://www.andor.com/learning-academy/rolling-and-global-shutter-exposure-flexibility, Retrieved on: Dec. 1, 2016, 3 pages.

Fellers, et al., "Digital Camera Readout and Frame Rates", http://hamamatsu.magnet.fsu.edu/articles/readoutandframerates.html, Retrieved on: Dec. 1, 2016, 7 pages.

Faion, et al., "Intelligent Sensor-Scheduling for Multi-Kinect-Tracking", In Proceedings of IEEE/RSJ International Conference on Intelligent Robots and Systems, Oct. 7, 2012, pp. 3993-3999.

"International Search Report and Written Opinion Issued in PCT Application No. PCT/US2018/020995", dated Jun. 8, 2018, 13 Pages.

\* cited by examiner

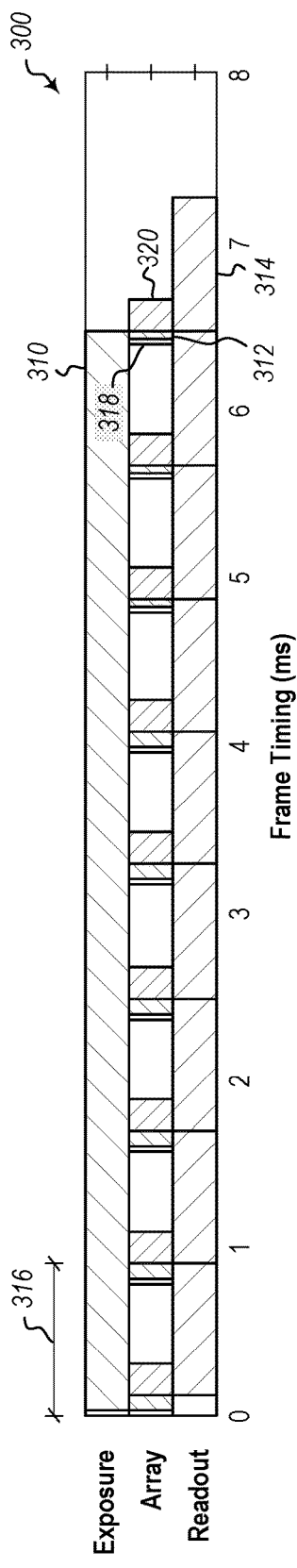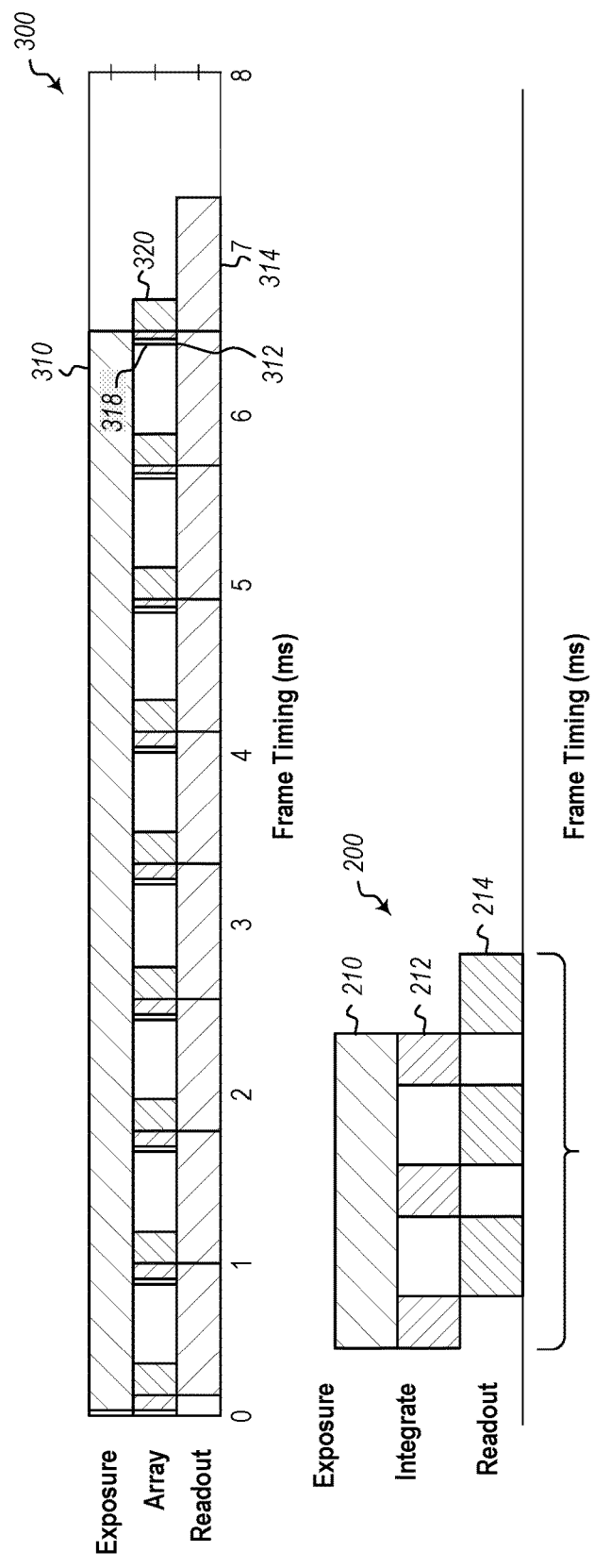

SYSTEMS AND METHODS FOR INTERLEAVING MULTIPLE ACTIVE CAMERA FRAMES

CROSS-REFERENCE TO RELATED APPLICATIONS

N/A

BACKGROUND

Background and Relevant Art

Three-dimensional (3D) imaging systems are configured to identify and map a target based on light that is reflected from the target. Many of these imaging systems are configured with a light source that is configured to emit light towards the target and a photoreceptor to receive the light after it is reflected back from the target.

Other active illuminated IR imaging systems may perform functions such as night vision, hand tracking, iris recognition, or eye tracking.

Some imaging systems (i.e., time-of-flight imaging systems) are capable of identifying the distances and positions of objects within a target environment at any given time by measuring the elapsed time between the emission of light from the light source and the reception of the light that is reflected off of the objects.

Other imaging systems (e.g., structured light systems) measure the distortion or displacement of light patterns to measure the shapes, surfaces and distances of the target objects. For instance, light may be emitted as a structured pattern, such as a grid pattern, dot pattern, line pattern, etc., towards the target environment. Then, the photoreceptor receives light that is reflected back from the target objects which is also patterned and which is correlated against the known initial pattern to calculate the distances, shapes, and positions of the objects in the target environment.

However, different active IR imaging systems operating concurrently can result in cross-contamination between the sensors. For example, a time-of-flight (TOF) camera utilizes the precise timing of the generation of an output light and the detecting of the reflected light. If a second source is emitting a second output light, the TOF calculations can be distorted, resulting in incorrect depth calculations. Optical interference can also result in unwanted signal/noise in the IR image. A structured light camera utilized the known origin of the light source to calculate distortion to the emitted light. If a second source is emitting a second output light, the structured light pattern can be overlaid or appear distorted for other reasons.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some embodiments, a system for 3D imaging includes a first 3D imaging camera and a second active illuminated IR imaging camera, and possibly other IR sensitive imaging systems, each in communication with a precision timing control block (TCON). The TCON synchronizes communication with the first 3D imaging camera and other IR imaging systems with timing precision of less than 1 microsecond, and in some instances even less than 20 nanoseconds. The system includes a first memory in communication with the first 3D imaging camera and a second memory device in communication with the second 3D imaging camera.

In other embodiments, a method of synchronizing IR-sensitive imaging systems includes beginning a first integration time of a first 3D imaging camera, ending the first integration time of the first 3D imaging camera, and beginning readout of the first 3D imaging camera to memory. The method includes beginning a second integration time of a second IR imaging camera after beginning the readout of the first 3D imaging camera to memory and ending readout of the first 3D imaging camera to memory. The method repeats to create interleaved frames or subframes.

In yet other embodiments, a method of 3D imaging with a plurality of cameras includes selecting a first camera schedule and identifying an inactive portion in the first camera schedule. The method further includes selecting a second camera schedule for a second 3D imaging camera, identifying an active portion in the second camera schedule and aligning the active portion of the first camera schedule with the inactive portion of the second camera schedule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that these drawings depict only typical embodiments and are not therefore to be considered to be limiting in scope, embodiments will be described and explained with additional specificity and detail through the use of the accompanying drawings in which:

FIG. 3 is a graph of another embodiment of a multiple camera subframes needed to generate a depth camera frame for a phase TOF imaging system, according to the present disclosure;

FIG. 4 is a shows the camera sub-frame interleaving of a 3D depth camera and an IR imaging system for Iris Recognition of a frame timing of FIG. 2 and the embodiment of a frame timing of FIG. 3, according to the present disclosure;

DETAILED DESCRIPTION

Figure 1:
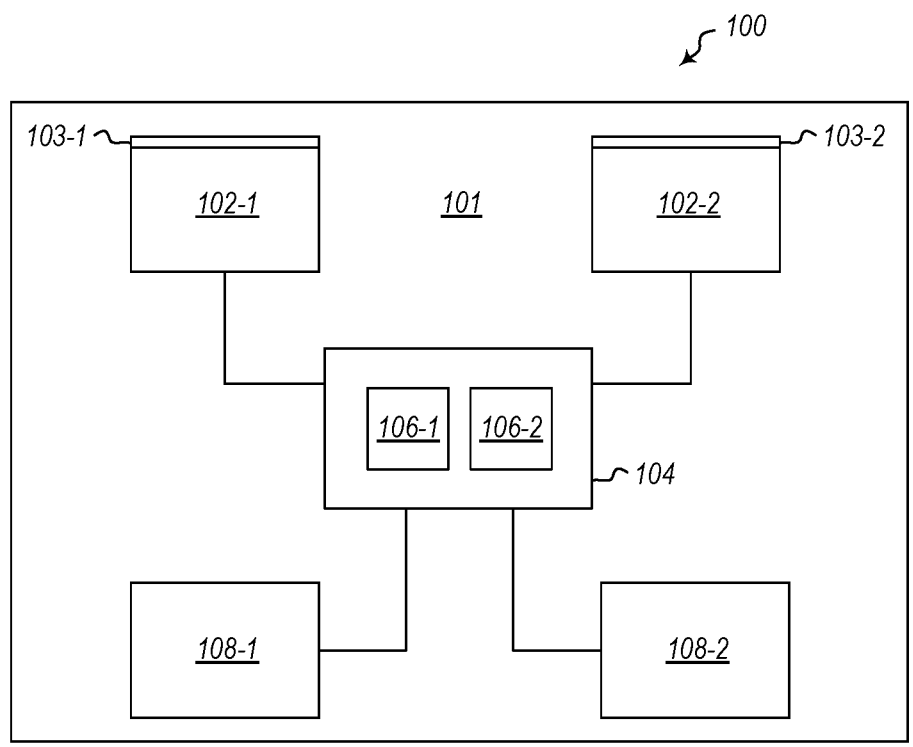
FIG. 1 is a schematic representation of an embodiment of a system for multiple active IR imaging sensors, according to the present disclosure.

Disclosed embodiments include improved imaging systems, as well as devices, systems, and methods for improving operating multiple active IR camera modules in a HMD for VR/AR applications.

With regard to the following disclosure, it will be appreciated that in the development of the disclosed embodiment(s), as in any engineering or design project, numerous embodiment-specific decisions will be made to achieve the developers' specific goals, such as compliance with system-related and business-related constraints, which may vary from one embodiment to another. It will further be appreciated that such a development effort might be complex and time consuming, but would nevertheless be a routine undertaking of design, fabrication, and manufacture for those of ordinary skill having the benefit of this disclosure.

Disclosed embodiments include, but are not limited to, head mounted displays that have multiple active IR imaging systems supporting depth (e.g., had tracking and spatial mapping), eye tracking, and other sensing applications. The disclosed embodiments provide techniques and systems for helping to reduce or eliminate interference between the different cameras. Such benefits can also be useful for embodiments that are incorporated into hardware (besides HMDs), such as vehicles, robots, etc., where multiple sensors are combined into an integrated systems.

In some embodiments, a 3D imaging system may include a plurality of 3D imaging cameras. These cameras may utilize illuminated IR camera modules for controlling different operating modes of the different cameras, including modules supporting different operating modes. For instance, eye tracking cameras can operate in Iris recognition mode or eye tracking mode. The depth cameras can also include different modes for tracking and spatial mapping. Each operating mode will have a different exposure time, read time, etc.).

In some embodiments, the 3D imaging system may include a 3D imaging camera for imaging and sensing objects in close proximity to the 3D imaging system and another camera for distance objects. For example, a 3D imaging system in a head mounted device (HMD) may have a first 3D imaging camera configured to detect hand movements or gestures of a user. The 3D imaging system may also include a second 3D imaging camera configured to image the environment and objects surrounding the user. The first 3D imaging camera may have a higher frame rate than the second 3D imaging camera. In other examples, the first 3D imaging camera may have a wider field of illumination (FOI) and/or field of view (FOV).

In some embodiments with active imaging cameras operating in the same wavelength range, the cameras may interfere with one another, limiting and/or preventing the accurate imaging and depth calculations of either camera. As used herein, "active" should be understood to mean any active imaging camera that emits an output light for the purposes of hand tracking, eye tracking, 3D imaging or depth calculations, the active illumination camera can include illuminated IR cameras and other 3D cameras. For example, an active 3D imaging camera may include a structured light 3D imaging camera, a time-of-flight (TOF) 3D imaging camera, a stereo 3D imaging camera, or another camera that emits an output light and detects a portion of the output light that is reflected off objects in the surrounding environment. For example, an active structured light camera operating in the infrared (IR) wavelength range may contaminate the TOF calculations of a nearby TOF camera operating in the IR wavelength range if the exposure of each overlap.

In some embodiments, a frame of an active IR imaging camera includes multiple subframes that each include a discrete exposure time. The emission of the output light is coordinated to the exposure time. The remaining non-exposure time may be available for interleaving exposures of a second active 3D imaging camera such that the complete frames are collected concurrently. The interleaving of subframe exposures may allow for higher framerates and less delay between each of the 3D imaging cameras while limiting or preventing optical contamination of each 3D imaging camera.

FIG. 1 illustrates an embodiment of a 3D imaging system 100, according to the present disclosure. The 3D imaging system 100 may be located in a housing 101. In some embodiments, the housing 101 may be a desk or table-mounted device, a portable device, a wearable device, or a vehicle. For example, the housing 101 may be a laptop or electronic device housing to allow gesture recognition or biometric identification. In other examples, the housing 101 may be a head-mounted device (HMD) to identify objects or hazards in the environment around the user for safety or interaction with the environment. For example, a virtual reality system that obstructs the user's vision of the environment may use a 3D imaging system 100 to detect objects or hazards in the surrounding environment to provide warnings to the user of nearby objects or obstructions. In another example, a mixed reality system that blends virtual information and images with the user's surroundings may use a 3D imaging system 100 to detect objects or people in the user's environment to integrate the virtual information with the physical environment and objects, or detect a user's eye for authentication or eye tracking applications. In yet other examples, a housing 101 for a 3D imaging system 100 may be a vehicle body, such as that of an aerial vehicle (e.g., a drone) or an automobile to allow autonomous driving, semi-autonomous driving, or driving assists to the operator.

The overall system may be comprised of multiple imaging systems including at least a first 3D imaging camera 102-1 and a second active IR imaging camera 102-2. The first 3D imaging camera 102-1 may include a first imaging sensor 103-1 and the second 3D imaging camera 102-2 may include a second imaging sensor 103-1. In some embodiments, both the first 3D imaging camera 102-1 and the second 3D imaging camera 102-2 may be active. In other embodiments, only one of the first 3D imaging camera 102-1 and the second 3D imaging camera 102-2 may be active. In either case, the simultaneous exposure of the first 3D imaging camera 102-1 and the second 3D imaging camera 102-2 may result in optical contamination of at least one of the two 3D imaging cameras.

In some embodiments, the first 3D imaging camera 102-1 and second 3D imaging camera 102-2 may be in data communication with a processor. For example, the camera exposure triggers may be controlled by a processor with a precision Timing Control block (TCON) 104. The TCON 104 coordinates timing between a plurality of cores in the processor 106-1, 106-2. In some embodiments, the first core 106-1 may be in data communication with the first 3D imaging camera 102-1 and the second core 106-2 may be in data communication with the second active IR imaging camera 102-2. In some embodiments, the TCON 104 may be a dedicated controller for coordinating timing between components of the 3D imaging system 100. In other embodiments, the TCON 104 may coordinate timing between additional components, such as other components contained in the housing 101.

In some embodiments, the first core 106-1 and second core 106-2 may be on a shared die, allowing rapid communication between the first core 106-1 and second core 106-2 during use. The TCON 104 shares a control bus that can control timing precision the first 3D imaging camera 102-1 and the second IR imaging camera 102-2 of less than 1 microsecond.

In some embodiments, the first 3D imaging camera 102-1 may be in data communication with a first memory device 108-1 and the second IR imaging camera 102-2 may be in data communication with a second memory device 108-2. For example, the first 3D imaging camera 102-1 may receive input light, create a frame or subframe of information and deliver that to the first memory device 108-1.

In other embodiments, the TCON 104 or other processor may be in data communication with the first memory device 108-1 and the second memory device 108-2. For example, the TCON 104 may be in data communication with both the first 3D imaging camera 102-1 and the second 3D imaging camera 102-2 as well as the first memory device 108-1 and the second memory device 108-2. The first 3D imaging camera 102-1 may receive input light, create a frame or subframe of data and deliver that to the TCON 104 (e.g., the first core 106-1), which, in turn, may deliver the data to the first memory device 108-1. The second 3D imaging camera 102-2 may receive input light, create a frame or subframe of data and deliver that to the TCON 104 (e.g., the second core 106-2), which, in turn, may deliver the data to the second memory device 108-2.

Figure 2:
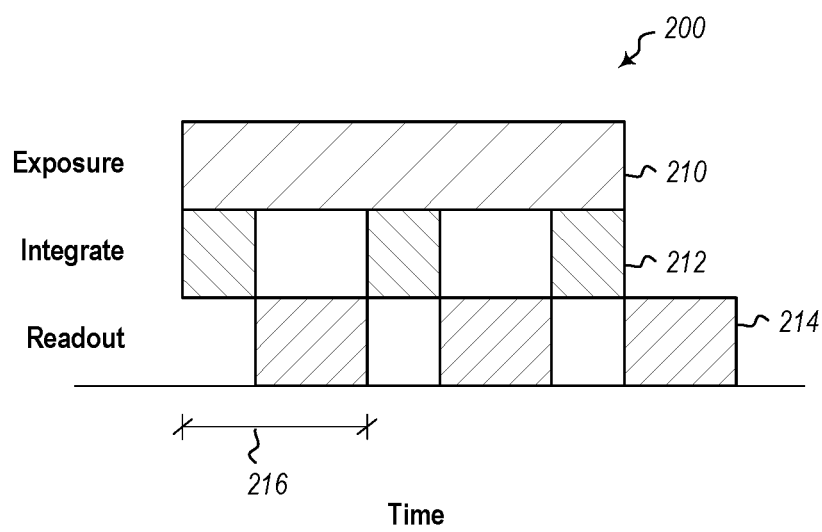
FIG. 2 is a graph of an embodiment of a camera frame comprised of multiple camera sub-frames, each with a separate integration and readout time, according to the present disclosure.

FIG. 2 illustrates a conventional timing of a first frame timing 200. The first frame timing 200 may have an exposure 210 of an actively illuminated IR imaging camera that is comprised of multiple integration and readouts. Each integration and readout comprises a sub-frame. Multiple subframes are required to make a complete camera imaging frame. The exposure time is defined as the first photon of the first camera subframe to the last photon of the last camera subframe. The IR imaging camera may integrate the input light into visual data during integration times 212, and then readout the data during a readout time 214 immediately following the integration time 212. Each sequence of integration time 212 and readout time 214 is a subframe 216 of the first frame timing 200.

A frame timing 200 may be considered to have an active portion, during which the 3D imaging camera is actively emitting and integrating IR light, and a non-active portion, during which the 3D imaging camera is not actively collecting and integrating input light, but is reading out the pixel response from the camera array. In some embodiments of a 3D imaging camera, the imaging sensor is exposed during the entire frame duration, and the 3D imaging camera does not integrate the input light during the readout time 214.

FIG. 3 illustrates an embodiment of a second frame timing 300 from a different 3D imaging camera. In some embodiments, the readout time from one camera 314 may overlap with a portion of the integration time 312. It is noted that, in some embodiments, there are multiple camera subframes that are used to generate a single depth frame, and that the overall exposure time is defined from the first photon of the first subframe to the last photon of the last subframe.

In some embodiments, a subframe 316 of the second frame timing 300 includes a part of the exposure time 310, an imaging sensor reset time 318, an integration time 312, an imaging sensor dump time 320, and the readout time 314. The imaging sensor may be actively integrating for a relatively small portion of the subframe 316, leaving a non-active portion of the subframe 316. In one example, the second frame timing 300 may have an end to end exposure time 310 of approximately 6.44 ms. Each of the seven subframes 316 may have an integration time 312 between approximately 59 µs and 94 µs. The reset time 318 may be about 20 µs and the dump time 320 may be about 190 µs. The readout time 314 may be about 800 µs. In such an example, each subframe may have at least 490 µs when the imaging sensor or array is idle, and an approximately 700 µs non-active portion of the subframe 316.

FIG. 4 illustrates an interleaving of the active portion of the first frame timing 200 and the non-active portion of the second frame timing 300. For example, the first frame timing 200 may be the frame timing of the first 3D imaging camera 102-1 of FIG. 1 and the second frame timing 300 may be the frame timing of the second 3D imaging camera 102-2 of FIG. 1. While both the first frame timing 200 and the second frame timing 300 have exposure times 210, 310 that overlap, the integration time 212 of the first frame timing 200 may be temporally aligned with the non-active portion of the second frame timing 300. In other embodiments, the integration time 212 of the first frame timing 200 may be temporally aligned with the portion of the second frame timing 300 in which the imaging sensor and/or array is idle (i.e., outside of the reset time 318, integration time 312, and dump time 320), for example, between the end of a imaging sensor dump time 320 and the start of an integration time 312.

Figure 5:
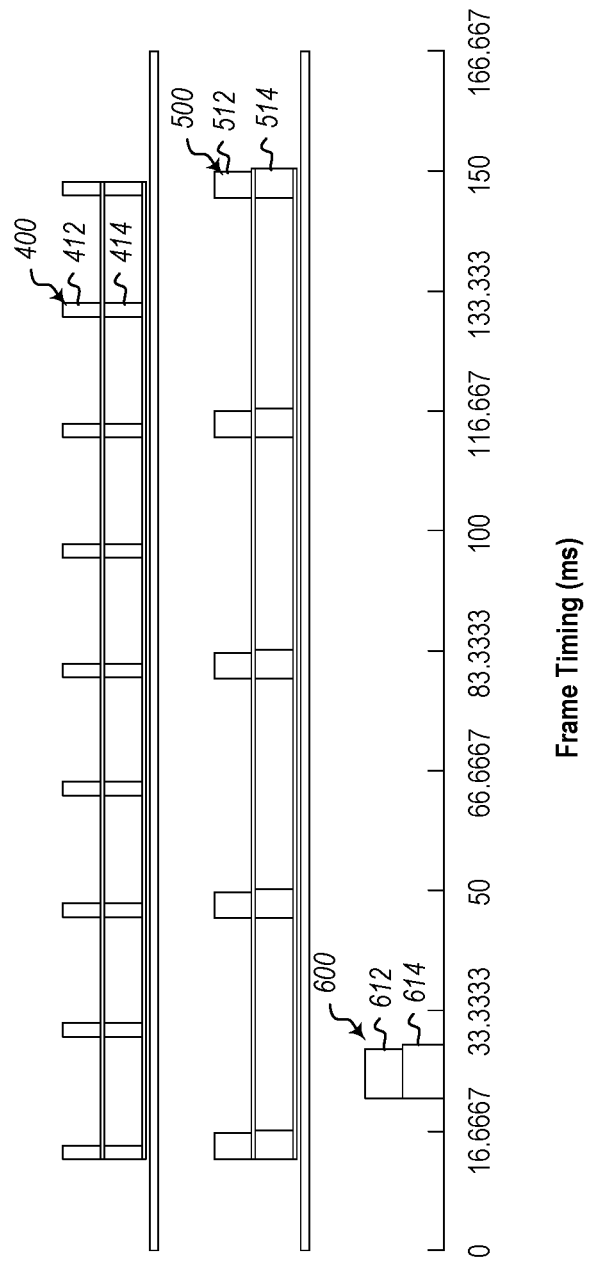
FIG. 5 is an embodiment of a set of frame timings for different operating modes of a 3D imaging camera, according to the present disclosure.

FIG. 5 illustrates another set of frame timings for an embodiment of a 3D imaging camera with multiple timing modes. For example, an active 3D imaging camera may have a plurality of frame timings, such as varying the duration of subframes or varying the number of subframes combined in a frame. FIG. 5 illustrates a third frame timing 400, a fourth frame timing 500, and a fifth frame timing 600 that may be different operating modes of a single active IR imaging camera for depth calculations.

The integration time 412 and readout time 414 of the third frame timing 400 may align with the integration time 512 and readout time 514 of the fourth frame timing 500. The third frame timing 400 has double the frame rate of the fourth frame timing 500, allowing for more frequent sampling for short range tracking of fast moving objects, such as hand gestures. The fifth frame timing 600 may be a long range mode that is a much lower frame rate, such as five frames per second, at higher power and longer integration time 612, to detect further objects than the short range modes illustrated by the third frame timing 400 and fourth frame timing 500. In some embodiments, this static timing allocation provides times when cameras are allowed to capture a frame. Depending on the system needs, the camera frame can be taken, or the camera can sit idle at the allocated frame time. Accordingly, the system can deterministically control when to fire the different cameras. Accordingly, in some embodiments, the disclosed methods include the system determining the camera schedules for the different cameras to control when to trigger the respective cameras to capture the camera frames or to refrain from triggering the cameras to capture the camera frames.

Figure 6:
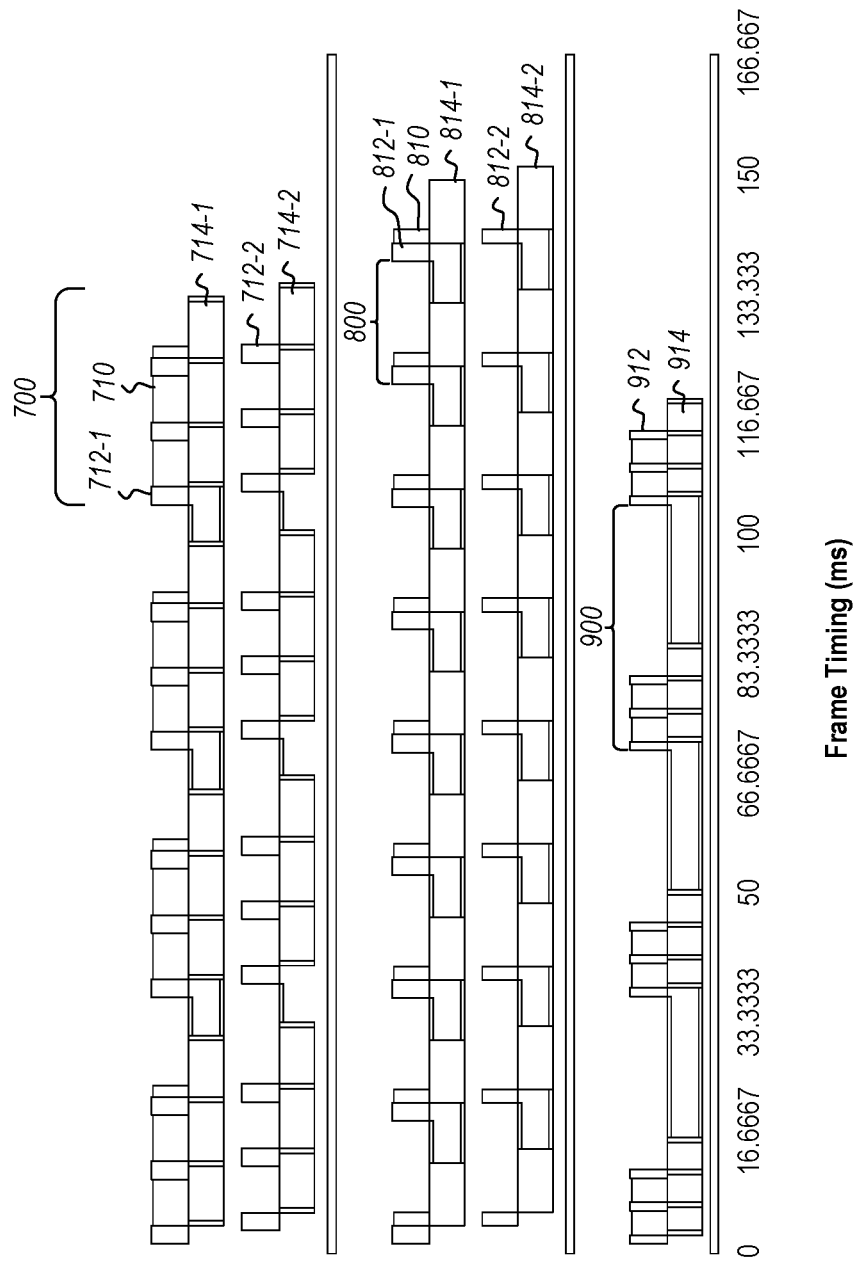
FIG. 6 is an embodiment of a set of frame timings for different operating modes of an eye tracking camera, according to the present disclosure.

FIG. 6 illustrates different operating modes of a second active IR imaging camera that may be operated in conjunction with the 3D imaging camera described in relation to the frame timings illustrated in FIG. 5. For example, an eye tracking camera may include a plurality of frame timings, such as varying the duration of subframes or varying the number of subframes combined in a frame. In an eye tracking camera, there may be a plurality of imaging sensors and illuminators. For example, a sixth frame timing 700 may include an iris integration time 712-1 and iris readout time 714-1 from an iris camera and include a gaze integration time 712-2 and gaze readout time 714-2. The sixth frame timing 700 may correspond to an allowable frame rate of 30 frames per second of the eye tracking camera. In some embodiments, at least one of the iris integration time 712-1 and the gaze integration time 712-2 may have a exposure 710 between Camera 1 integration times 712-1, 712-2. In other embodiments, the at least one of the iris integration time 712-1 and the gaze integration time 712-2 may have a shuttered exposure that corresponds to the integration times 712-1, 712-2.

The seventh frame timing diagram 800 illustrates a 60 frames per second timing that may include only one subframe. The seventh frame timing 800 may include an active portion having an iris integration time 812-1 and a gaze integration time 812-2 and an inactive portion during which an iris readout time 814-1 and/or a gaze readout time 814-2 occur. As shown in the sixth frame timing 700 and the seventh frame timing 800, an eye tracking camera may have a plurality of sensors interleaved within a single frame timing.

The eighth frame timing 900 illustrates a 30 frames per second frame timing with a short integration time 912 and readout time 914 to allow shorter subframes. Shorter subframes may reduce the amount of blur in the image and improve the clarity of the image for image recognition and/or tracking purposes.

Figure 7:
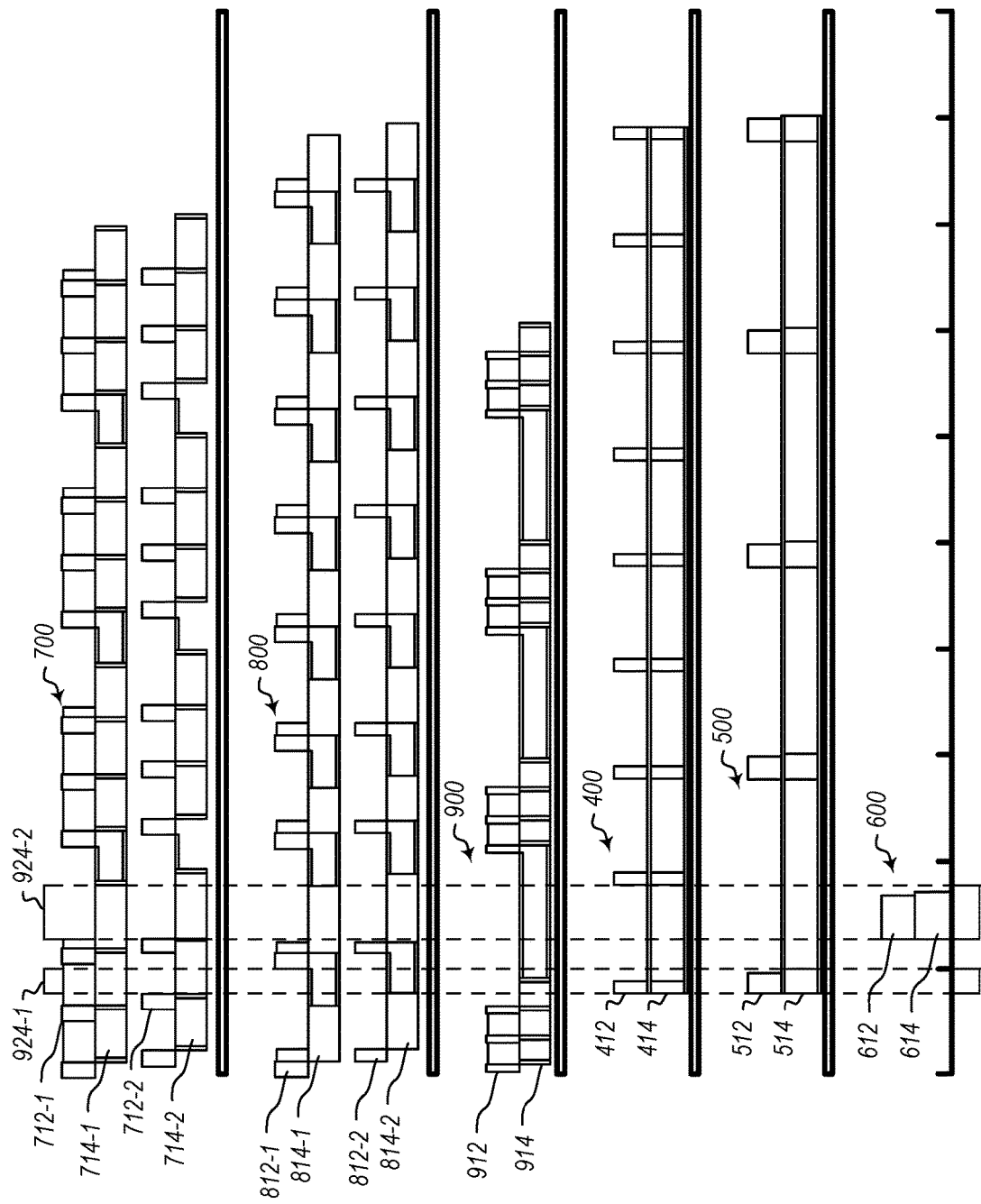
FIG. 7 is a representation of the interleaving of the set of frame timings of FIG. 5 with the set of frame timings of FIG. 6, according to the present disclosure.

FIG. 7 shows how the different frame timings 400, 500, 600 of the first 3D imaging camera in FIG. 5 may be interleaved with the frame timings 700, 800, 900 of the second active IR imaging camera of FIG. 6 without the active portions of the frame timing overlapping. A static schedule such as shown in FIG. 7 allows a 3D imaging system to freely select any combination of any of the frame timings 400, 500, 600 of the first 3D imaging camera and any of the frame timings 700, 800, 900 of the second 3D imaging camera without causing interference between the cameras.

For example, the third frame timing 400 and fourth frame timing 500 may have an integration time 412, 512 that is within a first inactive portion 924-1 of all of the sixth frame timing 600, seventh frame timing 700, and eighth frame timing 900. In some embodiments, the third frame timing 400 and fourth frame timing 500 may have an integration time 412, 512 that is interleaved between subframes of the sixth frame timing 600 and seventh frame timing 700. In other embodiments, the third frame timing 400 and fourth frame timing 500 may have an integration time 412, 512 that is interleaved between frames of the eighth frame timing 900.

In another example, the fifth frame timing 600 may have an integration time 612 that is within a second inactive portion 924-2 of all of the sixth frame timing 600, seventh frame timing 700, and eighth frame timing 900. In some embodiments, the fifth frame timing 600 may have an integration time 612 that is interleaved between frames of the sixth frame timing 600, seventh frame timing 700, eighth frame timing 900.

In some embodiments, the potential frame timings (i.e., operating modes) of the first 3D imaging camera and the second active IR imaging camera may have framerates that are multiples of one another. For example, the interleaving of a frame timing of the first 3D imaging camera and a frame timing of the second 3D imaging camera may be more reliable and/or simpler when the frame timing of the first camera is a 1×, 2×, 3×, 4×, 5×, 6×, 8×, 10×, or other multiple of the frame timing of the second camera. For example, the present disclosure illustrates frame timings with framerates of five frames per second, 30 frames per second, and 60 frames per second. In other embodiments, the frame timing of the first 3D imaging camera may have a framerate greater than the framerate of the frame timing of the second 3D imaging camera.

Figure 8:
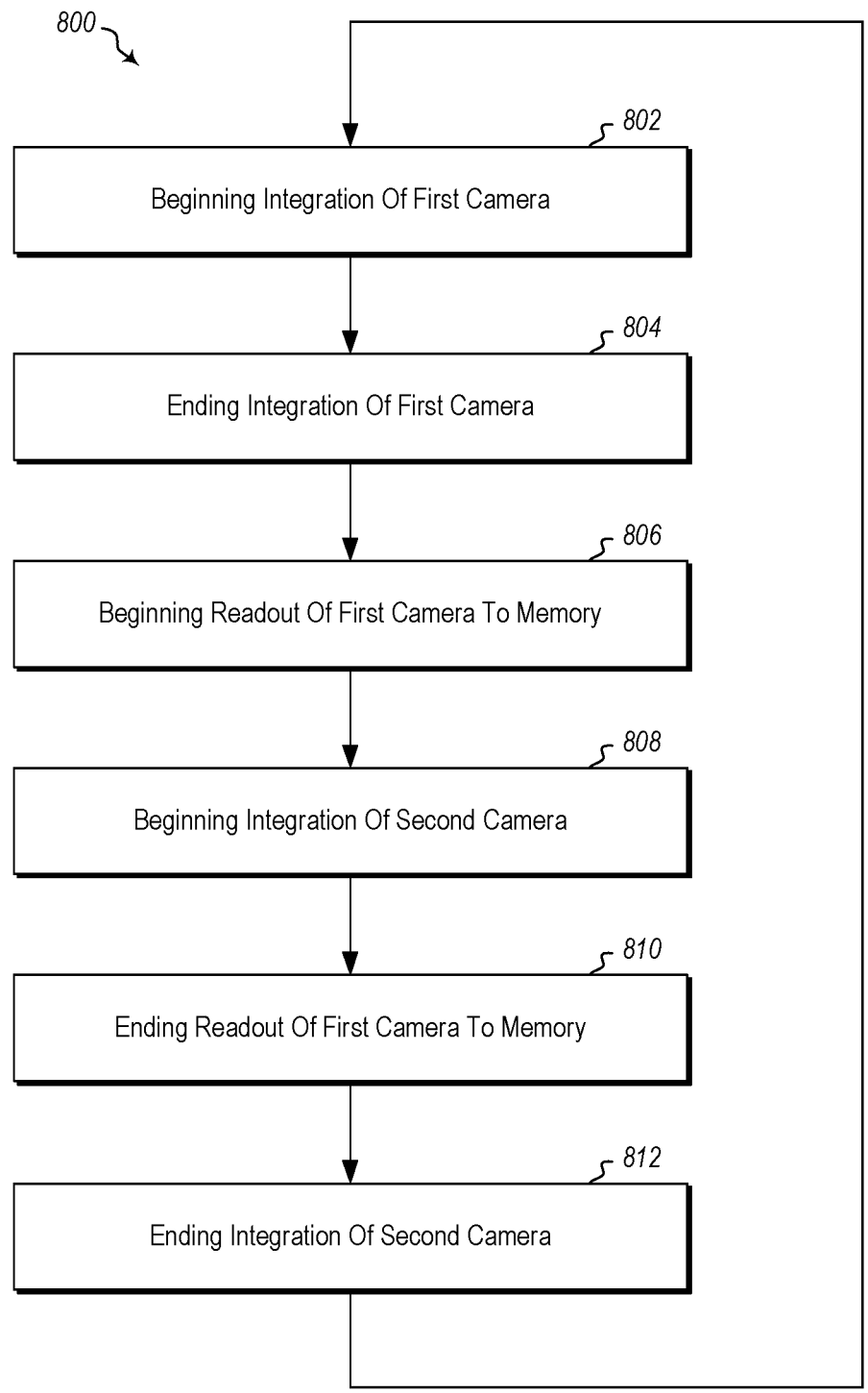
FIG. 8 is a flowchart illustrating an embodiment of a method of interleaving integration times of a plurality of cameras, according to the present disclosure.
Figure 9:
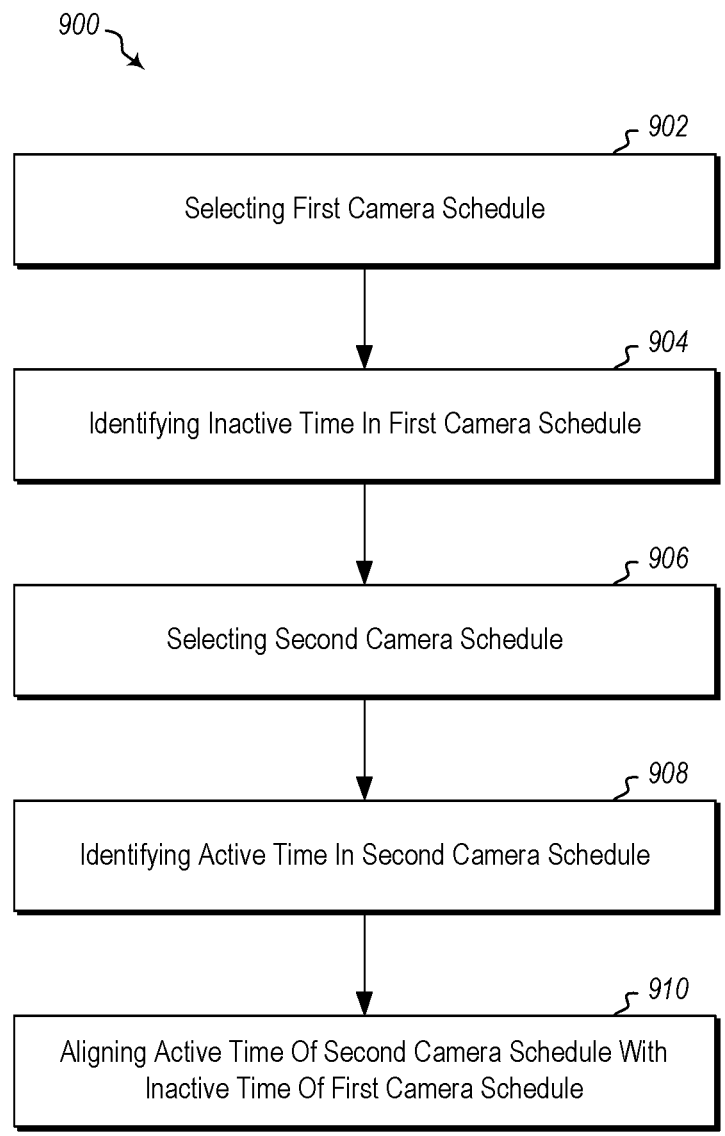
FIG. 9 is a flowchart illustrating an embodiment of a method of interleaving camera schedules from a plurality of cameras, according to the present disclosure.

FIG. 8 and FIG. 9 illustrate embodiments of methods of 3D imaging using a 3D imaging system as described herein. FIG. 8 illustrates an embodiment of a method of interleaving two frame timings to limit and/or prevent interference between a first 3D imaging camera and a second 3D imaging camera. The flowchart 800 illustrates an embodiment of the method including beginning an integration time of the first 3D imaging camera at 802. The integration time of the first 3D imaging camera ends at 804 and the readout time of the first 3D imaging camera begins at 806.

After ending the integration time of the first 3D imaging camera at 804, the integration time of the second 3D imaging camera may begin at 808. In some embodiments, the readout time of the first 3D imaging camera may be concurrent with the integration time of the second 3D imaging camera before ending the readout time of the first 3D imaging camera to memory at 810. The integration time of the second 3D imaging camera may end at 812 before beginning a new integration time of the first 3D imaging camera.

In some embodiments, the method may further include beginning a readout time of the second 3D imaging camera and at least part of the readout time of the second 3D imaging camera being concurrent with the integration time of the first 3D imaging camera.

FIG. 9 is a flowchart 900 illustrating an embodiment of a method of 3D imaging by selecting a frame timing from a set of potential frame timings (and/or operating modes) for each of a first 3D imaging camera and a second 3D imaging camera without producing interference between the first 3D imaging camera and the second 3D imaging camera.

The method includes selecting a first camera schedule (i.e., a frame timing) from one or more camera schedules of a first 3D imaging camera at 902. Within the first camera schedule, there may be a plurality of inactive portions of the first camera schedule including readout times and idle times both between subframes and between frames. After identifying the inactive time within the first camera schedule at 904, the method includes selecting a second camera schedule at 906. Similarly, the second camera schedule will include a plurality of active portions of the first camera schedule including integration time of subframes and/or frames. After identifying the active portion of the second camera schedule at 908, the active portion of the second camera schedule and the inactive portion of the first camera schedule may be aligned temporally to interleave the integration and/or exposure of the first 3D imaging camera and the integration and/or exposure of the second 3D imaging camera at 910.

In at least some embodiments, a system including a precision timing control block controlling a first camera and a second camera may allow for interleaving of camera exposure and/or integration times enabling higher framerates and throughput than a conventional sequential imaging system. The systems and methods described herein may limit and/or prevent optical contamination or interference between 3D imaging systems when at least one of the two is an active 3D imaging system and the 3D imaging systems are sensitive to the same wavelength range, such as infrared light.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for active illuminated imaging, the system comprising:
    a first active imaging camera;
    a second active imaging camera;
    a precision Timing Control block (TCON) in communication with the first active imaging camera and the second active imaging camera, the TCON configured to control the frame timing of the first imaging camera and the frame timing of the second imaging camera with synchronization precision of <10 microseconds between the first imaging camera and the second imaging camera, wherein the frame timing includes a plurality of subframes, the each subframe of the plurality of subframes including an integration time and a readout time; and
    one or more memory devices in communication with the first active imaging camera and the second active imaging camera.

2. The system of claim 1, the first active imaging camera being an active 3D imaging camera including at least one illuminator.

3. The system of claim 2, the second active imaging camera being an IR camera for eye tracking including at least one illuminator.

4. The system of claim 1, the first active imaging camera and the second active imaging camera being positioned in a housing.

5. The system of claim 4, the housing being a head-mounted device.

6. The system of claim 1, the first active imaging camera being a time-of-flight 3D imaging camera.

7. The system of claim 1, the first active imaging camera being a structured light 3D imaging camera.

8. A method for three-dimensional imaging, the method comprising:
    beginning a first exposure time of a first active imaging camera;
    beginning a first integration time of the first active imaging camera using a precision Timing Control block (TCON) in communication with the first active imaging camera;
    ending the first integration time of the first active imaging camera;
    beginning readout of the first active imaging camera to memory after ending the first integration time;
    beginning a second exposure time of a second active imaging camera during the first exposure time;
    beginning a second integration time of a second active imaging camera after beginning and during the readout of the first active imaging camera to memory using the TCON in communication with the second active imaging camera; and
    ending readout of the first imaging camera to memory.

9. The method of claim 8, further comprising ending integration of the second camera after ending readout of the first active imaging camera to memory.

10. The method of claim 9, further comprising beginning a readout of the second active imaging camera during the first integration time of the first imaging camera.

11. The method of claim 8, further comprising a third integration time of the first active imaging camera during the first exposure time.

12. The method of claim 11, wherein the first integration time includes emitting IR illumination light.

13. The method of claim 12, wherein the second integration time including emitting an output light.

14. The method of claim 8, further comprising timing control of the readout and beginning the second integration time with the TCON.

15. The method of claim 8, the first active imaging camera having a plurality of subframes in the first exposure time and the second active imaging camera having a plurality of subframes in the second exposure time.

16. A system for active illuminated imaging, the system comprising:
    a first active imaging camera;
    a second active imaging camera;
    a processor in communication with the first active imaging camera and the second active imaging camera
    a precision Timing Control block (TCON) in communication with the processor, the TCON configured to control the frame timing of the first imaging camera and the frame timing of the second imaging camera with a synchronization precision of <1 microsecond between the first imaging camera and the second imaging camera, wherein the frame timing includes a plurality of subframes, the each subframe of the plurality of subframes including an integration time and a readout time;
    a first memory device in communication with the processor; and
    a second memory device in communication with the processor, where the second memory device is in parallel communication with the first memory device.

17. The system of claim 16, the processor having a first core and a second core on a shared die.

18. The system of claim 17, the first core being in communication with the first active imaging camera and the second core being in communication with the second active imaging camera.

19. The system of claim 16, the TCON configured to control the frame timing of the first imaging camera and the frame timing of the second imaging camera between the first imaging camera and the second imaging camera with a synchronization precision of <20 nanoseconds.

20. The system of claim 19, further comprising camera exposure triggers controlled by the TCON.

* * * * *